L. ROUANET.
DOUBLE JAW CALIPERS.
APPLICATION FILED AUG. 4, 1917.

1,327,216.

Patented Jan. 6, 1920.

INVENTOR
Louis Rouanet
BY
ATTY.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

DOUBLE-JAW CALIPERS.

1,327,216.      Specification of Letters Patent.      Patented Jan. 6, 1920.

Application filed August 4, 1917. Serial No. 184,496.

*To all whom it may concern:*

Be it known that I, LOUIS ROUANET, a citizen of the Republic of France, residing at 42 Rue Franklin, Ivry-Port, Seine, in the Republic of France, have invented new and useful Improvements in Double-Jaw Calipers, of which the following is a specification.

The object of the present invention is the construction of a caliper which is designed to render great service in the manufacture of certain pieces, and especially of pieces which are to be assembled concentrically with other pieces of variable dimensions, a set of intermediate parts being placed between these two kinds of pieces, which intermediate parts invariably have exact dimensions.

The present invention consists in the design of a two jaw caliper in which two tactile bodies or gaging members carried respectively by the jaws are used for indicating the exact dimension to be given to each of the inside pieces in question, this dimension being obtained by the use of the outside pieces themselves, these pieces being placed in succession about tactile bodies or contact members provided at the other of the caliper jaws. This two-jaw caliper is especially intended for use in verifying the diameter of the rolling way in inside rings for ball-bearings, during the manufacture of said inside rings. When, for instance, the inside ring is produced first it is then desired to assemble an inside ring with this outside ring, and to interpose between the two rings a set of balls of invariable size. To obtain the desired result and to produce a caliper the gaging members of which will indicate the exact dimension to be given to the rolling way of the inside ring, the operator places upon the contact members of said caliper an outside ring which rests by its raceway upon said contact members and is self-centering about the same, a spring device being provided for that purpose. These two tactile bodies or contact members are for instance, according to the above example, a pair of balls having the same size as the balls which are to be eventually placed between the rolling ways of the two rings forming the ball-bearing.

It is of course required that one of the jaws of the caliper may be moved away from the other, and it is evident that when the verifying or gaging members are formed of two cylindrical parts whose diameter is that of the balls, and when these cylindrical parts or tactile bodies are in vertical alinement with the pair of balls or tactile bodies situated at the opposite ends of the jaws, in such case should an outside ring be placed about the contact members of said caliper, the distance between the cylindrical parts or gaging members will show the exact dimension which is to be given the diameter of the rolling way on the inside ring. The gaging members will thus permit to verify the diameter of the raceway on said inside ring.

The construction of the apparatus will be more clearly understood by referring to the accompanying drawing, which is understood to be only an example of the method employed.

Figure 1:
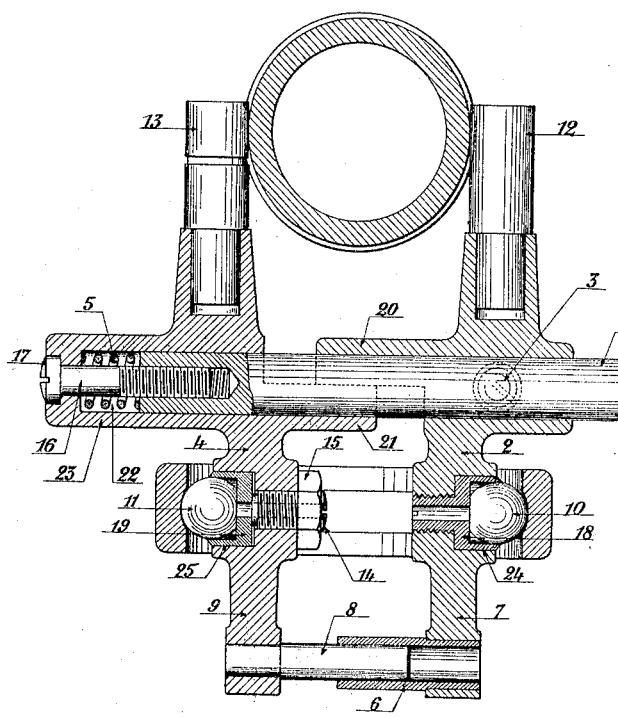
Figure 1 represents a caliper in vertical section.
Figure 2:
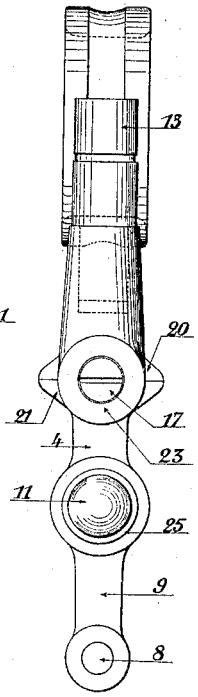
Fig. 2 is a side view of the same caliper.
Figure 3:
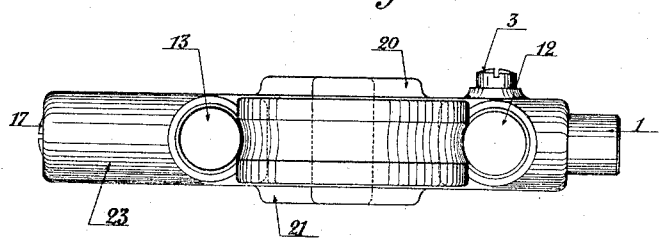
Fig. 3 is a plan view.

The caliper designed according to the present invention comprises a cylindrical rod 1 upon which is mounted a jaw 2, this latter being fixed rigidly to one of the extremities by any suitable means such as a screw 3. At the other end of the rod 1 is mounted a second jaw 4 which slides upon said rod 1; it is held constantly separated from the jaw 2 by the action of the spring 5 bearing upon the end of said rod 1 and disposed in a socket 22 of a cylindrical extension 23 of the jaw 4. In order to always keep both jaws in parallelism, a socket of sufficient length is attached to the end 7 of the jaw 2. Within this socket 6 and also guided by it, is disposed a stud 8 carried by the end 9 of the prong 4.

In the jaws 2 and 4, are respectively fixed two opposite tactile bodies or contact members 10 and 11 upon which is placed the outside ring of a ball-bearing to be inspected. In this way the ring is centered, owing to the spring 5 which is designed so as to give a sufficient amount of spring pressure. Two cylindrical tactile bodies or gaging members 12 and 13 are fixed respectively in any suitable manner on the jaws 2 and 4 and inserted for instance into corresponding sockets in said jaws. These two cylindrical tactile bodies will be used as a gage in order to verify the diameter of the rolling way on the inside ring of the ball-bearing.

The tactile body 11 may be provided with an adjustable device comprising a screw 14 which is threaded through the jaw 4 of the caliper and can be locked in any suitable position by means of the nut 15. On the other hand, the tactile body 13, for instance, may be formed as a limit gage. The jaw 4 is held on the cylindrical rod 1 by means of a screw 16 disposed in the end of the rod 1, this screw being provided with a head 17 for preventing the escape of the jaw 4 from the rod 1 under the action of the spring 5. According to the invention, the tactile bodies 10 and 11 are made up of balls inserted in the small cylindrical pieces 18, 19, screwed respectively into the jaws 2 and 4; each of these jaws having a cylindrical socket 24 and 25 respectively, for centering the pieces 18 and 19. The outer edge of said pieces 18 and 19 is spun over the balls 10, 11 in order to prevent the same from falling out. It is understood that the balls can be replaced by any other tactile bodies serving the same purpose. In a caliper designed for verification of the rolling ways on ball-bearings, all the tactile bodies have a diameter equal to that of the balls which are to be eventually placed between the two rings forming the ball-bearing, but for assemblage of other pieces, for instance pieces which are to make up roller-bearings, the tactile bodies can be made in different shapes and sizes.

In order that both jaws 2 and 4 may be suitably guided upon the rod 1 and held in parallelism, said jaws are provided with half cylinder portions 20 and 21 respectively, disposed one above the other, and having flat surfaces which are located in the horizontal plane containing the axis of the rod 1 and have a sliding fit one upon the other.

It is understood that this double caliper could be employed in some cases in the inverse sense, that is, an inside piece could be used for the verification of an outside piece during the manufacture of the latter. The tactile bodies 10 and 11 on one hand and 12, 13 on the other are all disposed so as to be removable from the jaws of the caliper, and in this way they are readily removed and replaced by similar parts having different sizes, when it is desired to verify similar pieces of another set.

Having now described my invention, what I claim as new and desire to secure by Letters Patent is:

1. A caliper comprising in combination a support, a jaw fixed on said support, a jaw guided on said support and movable toward and away from the fixed jaw, yielding means adapted to spread the jaws apart from each other, means for limiting the spreading apart of said jaws, two oppositely disposed contact members one on the fixed jaw and the other on the movable jaw, and two oppositely disposed gaging members one on the fixed jaw and the other on the movable jaw, the distance between said gaging members being in a definite relation and preferably equal to the distance between the opposite outer surfaces of the contact members.

2. A caliper comprising in combination a support, a jaw fixed on said support, a jaw guided on said support and movable toward and away from the fixed jaw, yielding means for spreading the jaws apart from each other, means for limiting the spreading apart of said jaws, two oppositely disposed contact members one on the fixed jaw and the other on the movable jaw, two oppositely disposed gaging members one on the fixed jaw and the other on the movable jaw, and means for adjustably securing one of the contact members on its supporting jaw.

3. A caliper comprising in combination a supporting rod, a jaw secured on said rod and having flat surfaces, a movable jaw supported and guided on said rod and having flat surfaces adapted to slide in contact with the flat surfaces on the fixed jaw, yielding means adapted to spread the jaws apart from each other, means for limiting the spreading apart of said jaws, two oppositely disposed contact members one on the fixed jaw and the other on the movable jaw, two oppositely disposed gaging members one on the fixed jaw and the other on the movable jaw and means for adjustably securing one of the contact members on its supporting jaw.

4. A caliper comprising in combination a support, a jaw fixed on said support, a jaw guided on said support and movable toward and away from the fixed jaw, two oppositely disposed balls one on the fixed jaw and the other on the movable jaw and two oppositely disposed cylindrical gaging members one on the fixed jaw and the other on the movable jaw, said cylindrical gaging members being in alinement with the corresponding balls and having the same diameter as the said balls.

In testimony whereof I have signed my name to this specification in the presence of two subscribing witnesses.

LOUIS ROUANET.

Witnesses:
 LOUIS MOSES,
 CHAS. P. PRESSLY.